March 29, 1932.     L. S. QUINAN     1,851,866

FRONT AXLE MOUNTING FOR TRACTORS

Filed Sept. 23, 1929

INVENTOR
L. S. Quinan
BY
ATTORNEY

Patented Mar. 29, 1932

1,851,866

UNITED STATES PATENT OFFICE

LOUIE S. QUINAN, OF SACRAMENTO, CALIFORNIA

FRONT AXLE MOUNTING FOR TRACTORS

Application filed September 23, 1929. Serial No. 394,532.

This invention relates to tractors, and especially to one of a certain particular make which, having an exceptionally high ground clearance, is very adaptable for use in connection with the cultivation of various crops such as are grown in rows, except for one feature. This feature is that the front wheels of this tractor are so close together that they cannot straddle the rows, and if the tractor is disposed so that said wheels will run between the rows the rear wheels are then out of line relative to the spaces between other rows.

The principal object of my invention therefore is to provide a front axle and wheel mounting, particularly designed as an attachment for said certain make of tractor to take the place of the standard front wheel arrangement with which they are provided, and so arranged that the front wheels may have the same tread width as the rear wheels, or whatever relative tread may be desired. It has been proven by exhaustive tests, that a farmer with a tractor equipped with this attachment is enabled to prepare his soil, plant his crops, as well as to cultivate and harvest same at the very minimum of expense, due to the fact that it practically is all done with the one engine and operator and entirely eliminates the use of horses.

While, as above stated, the device is particularly intended as an attachment it may also be incorporated as factory equipment in said one tractor or various others.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
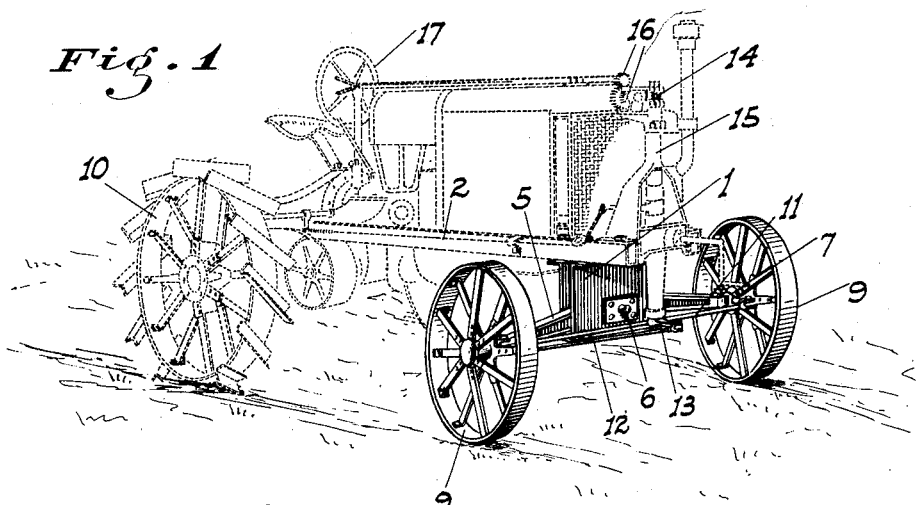
Fig. 1 is a perspective outline of the tractor showing my improved front wheel attachment mounted thereon.
Figure 2:
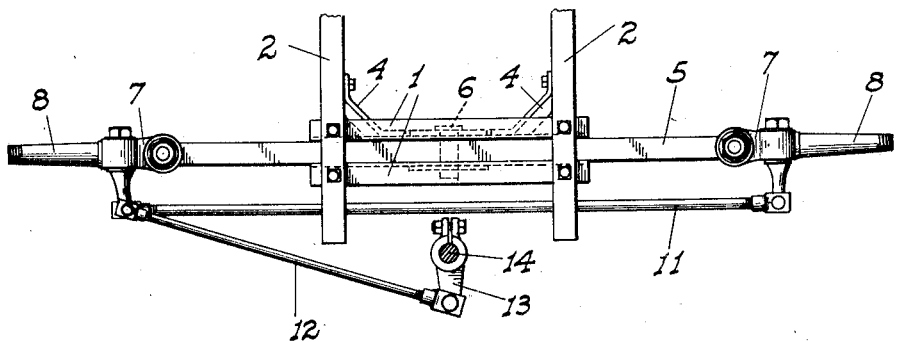
Fig. 2 is a top plan view of the attachment, with the wheels removed as connected to the frame of the tractor.
Figure 3:
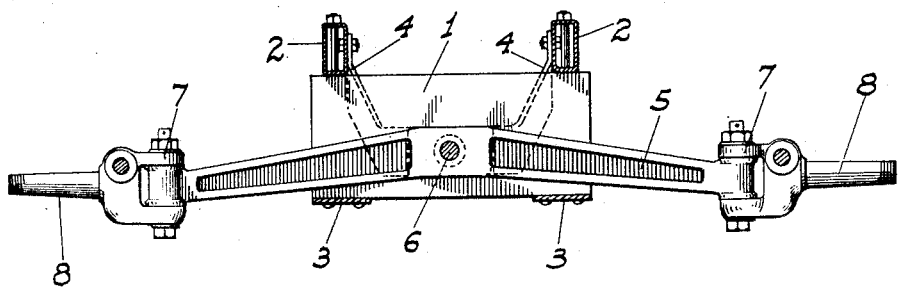
Fig. 3 is a front end view of the device taken on the line 3—3 of Fig. 2.

Referring now more particularly to the characters of reference on the drawings, the supporting structure of what I may term the placement axle comprises a pair of deep plates 1, preferably of heavy channel iron, which extend transversely of the tractor and are disposed in back to back but spaced relation to each other. These plates depend from and are bolted at the top onto the main side frames 2 of the tractor adjacent the front end of the latter and are connected together at the bottom by relatively small plates 3. Diagonal braces 4 between the rearmost plate and the side frames stiffen said plates and prevent any tendency for them to deflect in the plane longitudinally of the tractor.

The space between the plates is just sufficient to receive the axle 5—a forged beam considerably longer than the plates and pivoted centrally of its ends onto said plates centrally of their length by a horizontal pin 6. The axle is therefore free to swing up and down in a transverse plane, and by reason of the close fit of the axle between the plates, the pin only takes the direct down weight or shearing strains, and is not subjected to torsional strains, as will be evident.

The ends of the axle are formed in substantially the same manner as the front axle of an automobile, or in other words is provided with swivel knuckles 7 having horizontal spindles 8 projecting therefrom on which the wheels 9 are mounted; the wheels in the present instance being shown as lining up with the rear wheels 10 of the tractor or as having the same tread.

A tie rod 11 connects the two knuckles so that they will turn together, and one knuckle is connected by a transversely extending drag link 12 with an arm 13 projecting radially from a vertical shaft 14 disposed just in front of the plane of the plates 1. This shaft is the same as or takes the place of the one originally provided as the king pin of the original front wheel mounting, and is turnably mounted in a support 15 projecting upwardly from the front end of the frame 2. The upper end of this shaft is connected by gearing 16, the same as in the original assembly, with the steering wheel 17 which is located adjacent the rear end of the tractor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a tractor, a front axle, a centrally disposed horizontal pivot for the same, wheel-spindle supporting knuckles mounted on the ends of the axle for movement about vertical axes and connected to each other, a transversely extending drag link connected at one end to one knuckle in front of the axle, a horizontal arm extending longitudinally of the tractor to which the other end of the link is connected and disposed on a level substantially the same as that of the axle pivot, and a vertical operating shaft from which the arm projects radially, turnably mounted on the tractor and disposed in front of the same in transverse alinement with the axle pivot.

2. In a tractor having a main frame, a pair of plates of substantially uniform width from end to end, such plates being rigidly secured to the under side of the frame near the forward end thereof, the plates being spaced apart in face to face relation, an axle pivoted between the plates and capable of oscillating on its pivot, the plates forming bearing surfaces against the axle on both sides of the pivot to prevent lateral torsional strain being imposed upon such axle with the draft movements of the tractor.

In testimony whereof I affix my signature.

LOUIE S. QUINAN.